May 22, 1945.   H. S. JONES   2,376,488
CONTROL APPARATUS
Filed Nov. 4, 1942
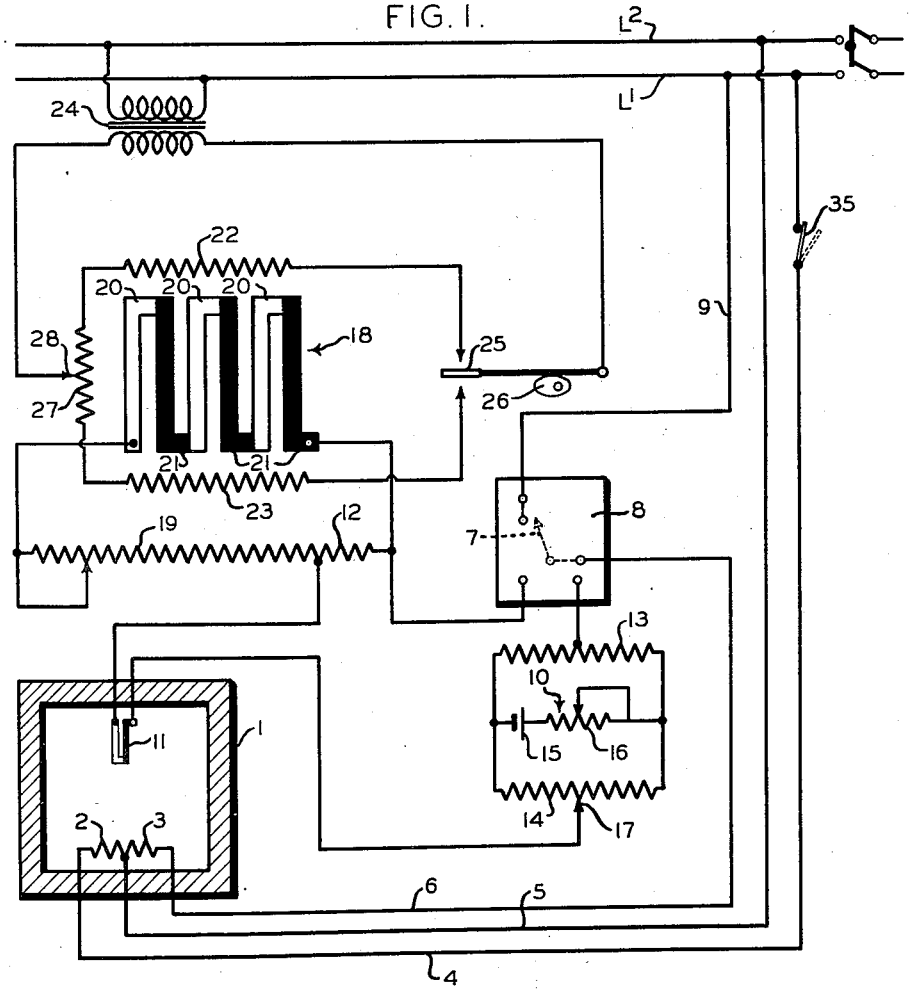
FIG. 1.
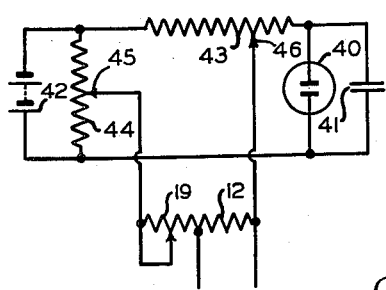
FIG. 3.
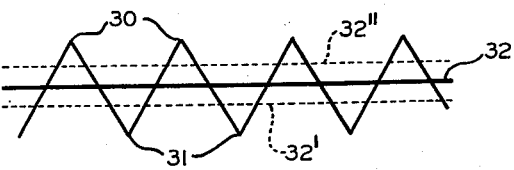
FIG. 2.
FIG. 4.
INVENTOR.
HARRY S. JONES.
BY *GBSpangenburg*
ATTORNEYS.

Patented May 22, 1945

2,376,488

UNITED STATES PATENT OFFICE 2,376,488

CONTROL APPARATUS

Harry S. Jones, Washington, D. C., assignor to The Brown Instrument Company, Philadelphia, Pa., a corporation of Pennsylvania Application November 4, 1942, Serial No. 464,535

17 Claims. (Cl. 236—69)

The general object of the present invention is to provide an improved control system of the on-off, time proportioning type. My improved control system is well adapted for use in the control of any industrial process in which suitable control results can be obtained by maintaining maximum and minimum control actions during regularly alternating time periods and by inversely varying the durations of the successive periods in accordance with the direction and extent of departure of a control quantity from a normal value thereof when the value of said quantity is within a suitable throttling range, and by continuously maintaining said maximum or said minimum control action, dependent on the direction of its displacement from the throttling range, when said control quantity value is out of said range.

For optimum results the magnitudes of said maximum and minimum control actions should be suitably related to the requirements of the control system, and in some cases the minimum control action may well be of zero value.

A more specific object of the present invention is to provide an improved control system which is of the type described and which comprises an electric control circuit and a thermocouple or other condition responsive device for impressing on said circuit a small voltage which varies in accordance with changes in a control temperature or other control quantity, and which also comprises a means for impressing on said circuit a low frequency alternating voltage of a magnitude suitably relating to that of the first mentioned voltage, and which also comprises a control instrument or regulating relay responsive to the current flow in said circuit.

The length or extent of the throttling range of the control system depends upon the relative magnitude of the two above mentioned voltages and in its preferred form my improved control system comprises adjustment means for increasing and decreasing the magnitude of the alternating voltage impressed on the control circuit and thereby increasing and decreasing the throttling range of the control system.

In a preferred form of the present invention, I employ novel means devised by me for creating the low frequency alternating voltage impressed on the control circuit, but in some cases the means employed for creating such voltage may be of known type.

Still more specific objects of the invention are to provide simple and effective means for varying the extent of the control system throttling range, as above described, and to provide simple and effective means for manually or automatically effecting compensating or reset adjustments of the control system, which enable the latter to maintain the same control temperature or quantity when the load on the furnace or other controlling device is relatively heavy as when it is relatively light.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Of the drawing:

Fig. 1 is a diagrammatic representation of an electric furnace control system embodying a preferred form of the present invention;

Fig. 2 is a diagram illustrating the variations in the alternating voltage impressed on the control circuit shown in Fig. 1;

Fig. 3 is a diagrammatic representation of means alternative of that disclosed in Fig. 1, for impressing an alternating emf on the control circuit; and Fig. 4 is a diagram illustrating variations in the alternating voltage impressed on the control circuit shown in part in Fig. 3.

In Fig. 1, I have illustrated an embodiment of the present invention in which the heat input to an electric furnace I is maintained at a maximum rate during certain periods by the energization of two heating resistances 2 and 3, and during other periods is maintained at a minimum rate by energizing only the resistance 2.

The terminals of the heating resistance 2 are connected to conductors 4 and 5 respectively, and the terminals of the heating resistance 3 are connected to conductors 5 and 6. As shown, the conductors 4 and 5 are respectively connected directly to supply conductors L¹ and L². The conductor 6 is directly connected to the switch element 7 of a control instrument or relay device 8 which actuates said switch element to connect the conductor 6 to, or disconnect it from, a branch conductor 9 from the supply conductor L¹, accordingly as the strength of energizing current for the device 8 is or is not less than a predetermined value. The instrument or relay 8 may take any suitable form which may be convenient. In particular, it may well be a millivolt meter or deflecting pyrometer of commercial form, including a mercury control switch opened and closed by an actuating element corresponding to the element 7 of Fig. 1, accordingly as the voltage impressed on the device 8 does or does not exceed a predetermined value which is determined in a customary manner by a manually effected control point adjustment of said device.

As shown, the instrument 8 is a millivolt meter connected in series in a control circuit with a potentiometer 10, a thermocouple 11 and a resistance 12. The thermocouple 11 is responsive to the temperature of the furnace. The potentiometer 10 comprises resistors 13 and 14 connected in parallel with a battery 15 and an adjustable resistance 16, and the instrument 8 has one terminal connected to an intermediate point of the resistor 13, and the thermocouple 11 has one terminal connected to an intermediate point of the resistance 14 through a slide contact 17.

In accordance with the present invention, a suitable low frequency voltage is impressed on the terminals of the resistance 12 by means which may take various known forms. In the preferred form of the invention shown in Fig. 1, however, I make use of novel means devised by me for impressing the alternating voltage on the resistance 12. The said means comprise a thermopile 18 having one of its terminals connected directly to one terminal of the resistance 12 and having its other terminal connected to the second terminal of the resistance 12 through a variable resistance 19. The thermopile 18 has one set of junctions 20 of similar polarities, in position to be heated by current flow through an electric heating resistance 22, and has its set of junctions 21 which alternate with the junctions 20 in position to be heated by an electric heating resistance 23.

The heating resistances 22 and 23 are alternately energized by current supplied by a transformer 24 through circuit connections including a switch contact 25 which is periodically moved by a cam 26, back and forth between one position in which it is in engagement with one terminal of the heating resistance 22 and is disconnected from the heating resistance 23, and a second position in which it engages one terminal of the resistance 23 and is out of engagement with the heating resistance 22. The second terminals of the heating resistances 22 and 23 are connected by a resistance 27. A sliding contact 28 in engagement with and adjustable longitudinally of the resistance 27, is connected to one terminal, and the switch contact 25 is connected to the second terminal of the secondary winding of the transformer 24. The latter has its primary winding connected across the supply conductors L¹ and L².

The cam 26 is advantageously rotated by a synchronous motor which gives the cam an angular velocity of the order of one revolution per minute, and the cam and switch parts are so formed and disposed that the time required for each complete rotation of the cam 26 comprises two successive fractional portions or periods, in one of which the transformer supplies current to the heating resistance 22 and in the other of which it supplies current to the heating resistance 23.

The alternate energization of the heating resistances 22 and 23, causes the temperature of the thermopile junctions 20 to regularly increase and decrease during successive periods in which the temperature of the thermopile junctions 21 are caused to regularly decrease and increase, respectively. In consequence, the thermopile 18 impresses a voltage on the resistance 12 tending to create current flow through the latter in one direction when the temperature of the junctions 20 exceeds that of the junctions 21, and in the opposite direction when the junctions 21 are hotter than the junctions 20. Furthermore, the voltage impressed on the resistance 12 by the thermopile 18 may be an alternating voltage of the saw tooth curve type shown in Fig. 2, wherein successively established voltage value points 30 at one side, and successively established voltage value points 31 at the other side of a zero or base voltage line 32, are connected in pairs by substantially straight line sections, each inclined to and extending across the base line 32. It is noted that the heat inertia of the thermopile 18 and the heater resistances 22 and 23 tends to cause the voltage value points 30 and 31 at opposite sides of the alternating voltage shown in Fig. 2 to be curved whereby the alternating voltage impressed on the resistance 12 by the thermopile 18 actually may not be of the saw tooth curve type shown in Fig. 2 but may be more sinusoidal in character.

In the normal contemplated operation of the apparatus shown in Fig. 1, the fluctuating current flow through the instrument 8 at any instant will comprise a thermopile current component corresponding in direction and value to the direction and value at the instant of the alternating voltage created by the thermopile 18, and a thermocouple component which is unidirectional and which changes in value only when and as changes occur in the furnace temperature to which the thermocouple 11 is exposed.

To maintain the heat input to the furnace at its minimum rate when the furnace temperature is high, the value of the thermocouple current component must exceed the value of the thermopile current component when the two components are opposite in direction, as otherwise, the instrument 8 would necessarily effect the energization of the furnace heating resistance 3 during each revolution of the cam 26. In ordinary practice, moreover, the normal magnitude of the thermal voltage should substantially exceed the magnitude of the thermopile voltage impressed on the control circuit in the sense required to keep the control current a pulsating unidirectional current, with the difference between its maximum and minimum values less than its average value. An increase or decrease in the resistance 19 in circuit will vary the relative magnitudes of the thermopile and thermocouple current components, and will thereby decrease or increase the throttling range as hereinafter described.

In the normal contemplated use of the apparatus shown in Fig. 1, with ideal calibration and with the furnace load at its normal value, the furnace temperature to which the thermocouple 11 responds will be that which the apparatus is intended to maintain, and the switch element 7 will energize the furnace heating resistance section 3 during one-half of the time required for each revolution of the cam 26. When the actual furnace temperature rises above or falls below the normal furnace temperature, the resultant increase or decrease in the voltage of the thermocouple 11 will respectively increase or decrease the average value of the pulsating current flowing through the control circuit and the switch element 7 of the instrument 8 will then keep the heating resistance 3 energized less than, or more than half the time, respectively.

When the furnace temperature is below the throttling range, as it ordinarily will be in starting the heater into operation, the maximum current flow through the instrument 8 will not be high enough to cause the switch element 7 to deenergize the heating resistance 3, during any portion of the revolution of the cam 26. Conversely, when the furnace temperature rises above the throttling range, as it may in a final portion of a batch heating operation, for example, the minimum current flow through the instrument 8 will not be low enough to effect energization of the resistance 3 during any portion of the rotation of the cam 26.

With the apparatus shown in Fig. 1, arranged and operated as described, heat will be supplied to the furnace at a maximum rate when both heating resistances 2 and 3 are energized, and will be supplied at a minimum rate when only the resistance section 2 is energized, but other arrangements may be employed. For example, by the simple expedient of opening the closed switch 35 in the conductor 4 shown in Fig. 1, the heating resistance 2 may be rendered inoperative and the minimum furnace heat input rate will then be a zero rate when the heating resistance 3 is deenergized, and will be a maximum rate when the resistance 3 is energized, although the heater will then receive no heat except that due to the energization of resistance section 3.

As will be apparent to those skilled in the art, the effect of decreasing or increasing the amount of adjustable resistance 19 in circuit with the thermopile 18, is to increase or decrease the difference between the maximum and minimum values of the current flowing through the instrument 8, and thus to increase or decrease the extent of angular adjustment of the switch actuating element 7 of the instrument 8 under any particular operating condition. One practical effect of such an increase in the oscillation range of the switch 7 is to increase the effect on the control action and result of the thermopile relative to that of the thermocouple 11, and thus to increase the change in the voltage of the thermocouple necessary to keep the switch arrangement 7 continuously at one side or the other of the position in which it connects the conductor 5 to the conductor 9. The last mentioned increase constitutes an increase in the control throttling range.

The effect of an upward adjustment of the contact 28 along the resistance 27 is to increase the magnitude of the thermopile heating effect produced by the resistance 22 relative to that produced by the resistance 23. If we assume that in Fig. 2, the voltage values 30 are those created when the temperatures of the junction points 20 are at their maximum, the effect of an upward adjustment of the contact 28 on the voltage relations shown in Fig. 2, may be illustrated by displacing the zero voltage line 32 from its full line position into the position of the subjacent dotted horizontal line 32'. Conversely, the effect on the voltage relations shown in Fig. 2 of a downward adjustment of the contact 28 may be illustrated by a displacement of the line 32 into the position of the upper horizontal dotted line 32''.

The practical effect of raising or lowering the contact 28 of Fig. 1 is thus to decrease or increase the furnace temperature which the control system tends to maintain. The adjustment of the contact 28 thus constitutes a compensated or reset adjustment which may be automatically or manually effected to compensate for furnace load changes and thereby enable the system to maintain the same normal furnace temperature during periods in which the furnace load is relatively heavy and during periods in which the furnace load is relatively light.

As will be recognized by those skilled in the art, the control system disclosed is practically free from inherent time lag and when properly calibrated will reduce the hunting tendency of the furnace heating or other controlled process to a practical minimum. Furthermore, the thermopile 18, resistances 22 and 23 and motor actuated switch 25 constitute a simple and relative inexpensive apparatus for producing the relatively small magnitude, saw tooth curve type of alternating voltage needed for optimum results with a control system of the general type illustrated in Fig. 1. However, I may use other means for creating the alternating voltage impressed on such a control circuit as is shown in Fig. 1. For example, I may use for that purpose, a so-called relaxation oscillator of the sort shown in Fig. 3.

In Fig. 3 a glow discharge tube 40 and a condenser 41 are connected in parallel with one another, and in series with a battery 42 and a resistance 43, which is high, usually not less than one megohm, to form a typical glow tube relaxation oscillator. For use in accordance with the present invention, I advantageously connect a resistance shunt 44 about the battery 42, and connect a sliding contact 45 in engagement with and adjustable along the resistance 44 to one terminal of the control circuit resistance 12 directly or through the adjustable resistance 19, and I connect the other terminal of the control circuit resistance 12 to the point 46 in the oscillator circuit adjacent the end of the resistance 43 which is nearest to the glow tube 40 and condenser 41, and is farthest from the battery 42 and resistance 44, as shown. The position of contact 46 along resistance 43 does not have to be adjacent the end of resistance 43 nearest to the glow tube, however, but is determined by the position of contact 45 along resistance 44.

As those skilled in the art will understand, the oscillation frequency of the oscillator shown in Fig. 3 is determined by the time required for the voltage of the condenser 41 to increase the breakdown potential required for the discharge of the tube 40 from the voltage which it had at the end of the previous glow tube discharge operation. With the contact 45 and point 46 located as shown in Fig. 3, the potential difference between said contact and point will increase gradually to a maximum positive value established when the condenser voltage has built up to its maximum value, and then will fall almost instantly to a minus value established by the tube discharge.

The potential difference between the contact 45 and point 46 may be represented by a saw tooth curve of the character shown in Fig. 4, comprising voltage increasing portions 50 which are curved in consequence of the fact that the rate of potential increase diminishes as the condenser voltage approaches its maximum breakdown value. Each voltage decrease section 51 of the curve shown in Fig. 4 while straight, differs from voltage decrease sections of the curve shown in Fig. 2, in being more vertical as a result of the very small time interval required for the glow tube discharge.

The control system illustrated in part in Fig. 3, will have the same general operating characteristics as the control system shown in Fig. 1. The to and fro adjustment of the contact along the resistance 19 will decrease and increase the potential impressed on the control circuit and increase and decrease the throttling range. Compensating or reset adjustments analogous to those obtained by adjusting the contact 28 along the resistance 27 of Fig. 1, may be effected by suitably related adjustments of the contact 45 along the resistance 44 and of the point 46 along the resistance 43.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent, is:

1. In a control system, the combination with an electrical control circuit, of a device responsive to current flow through said circuit, means responsive to a controlling condition for impressing on said circuit a small uni-directional voltage varying with said condition, means for continuously impressing on said circuit a low frequency alternating voltage of saw tooth curve type and of a magnitude less than the normal magnitude of the first mentioned voltage comprising physically stationary means having two operative conditions and operative in one condition to impress on said circuit a gradually increasing voltage of one polarity and operative in the other of said conditions to impress on said circuit a gradually increasing voltage of the opposite polarity and means to alternately adjust said physically stationary means to each of its operative conditions, and means actuated by said device to maintain a control action of one magnitude or of a different magnitude accordingly as the magnitude of said current is less than or exceeds a predetermined value.

2. In a control system, the combination with an electrical control circuit, of a device responsive to current flow through said circuit, means responsive to a controlling condition for impressing on said circuit a small uni-directional voltage varying with said condition, means for impressing on said circuit a low frequency alternating voltage of saw tooth curve type and of a magnitude less than the normal magnitude of the first mentioned voltage as the latter varies through a throttling range comprising physically stationary means having two operative conditions and operative in one condition to impress on said circuit a gradually increasing voltage of one polarity and operative in the other of said conditions to impress on said circuit a gradually increasing voltage of the opposite polarity and means to alternately adjust said physically stationary means to each of its operative conditions, means actuated by said device to maintain a control action of one magnitude or of a different magnitude, accordingly as the magnitude of said current is less than or exceeds a predetermined value, and means for varying the magnitude of said alternating voltage and thereby varying said throttling range.

3. In a control system, the combination with an electrical control circuit, of a device responsive to current flow through said circuit, means responsive to the value of a control quantity for impressing on said circuit a small uni-directional voltage varying with said value, means for impressing on said circuit a low frequency alternating voltage of saw tooth curve type and of a magnitude less than the normal magnitude of the first mentioned voltage comprising physically stationary means having two operative conditions and operative in one condition to impress on said circuit a gradually increasing voltage of one polarity and operative in the other of said conditions to impress on said circuit a gradually increasing voltage of the opposite polarity and means to alternately adjust said physically stationary means to each of its operative conditions, means actuated by said device to maintain a maximum or minimum control action accordingly as the magnitude of said current is less than or exceeds a predetermined value, and means for adjusting the second mentioned means to vary the relative maximum values of the components of said alternating voltage in the direction of, and in the direction opposite to said uni-directional voltage.

4. In an electric control system, the combination with a condition responsive device maintaining a small uni-directional voltage varying with said condition and means for producing a low frequency, alternating voltage coacting with the first mentioned voltage to maintain a pulsating control current, said last mentioned means comprising a thermopile and means for alternately heating and cooling its junctions of one polarity while simultaneously respectively cooling and heating its junctions of the opposite polarity.

5. In an electric control system, the combination with a condition responsive device maintaining a small uni-directional voltage varying with said condition and means for producing a low frequency, alternating voltage coacting with the first mentioned voltage to maintain a pulsating control current, said last mentioned means comprising a thermopile, means for alternately heating and cooling its junctions of one polarity while simultaneously respectively cooling and heating its junctions of the opposite polarity, and means for varying the relative effects of said device and first mentioned means on the magnitude of said control current.

6. In an electric control system, the combination with a condition responsive device maintaining a small uni-directional voltage varying with said condition, of means for producing a low frequency, alternating voltage coacting with the first mentioned voltage to maintain a pulsating control current, said last mentioned means comprising a thermopile and means for alternating heating and cooling its junctions of one polarity and simultaneously respectively cooling and heating its junctions of the opposite polarity, and means for varying the relative heating effects to which the thermopile junctions of opposite polarity are subjected.

7. In a control system, the combination with an electrical control circuit, of a device responsive to current flow through said circuit, means responsive to a controlling condition for impressing on said circuit a small uni-directional voltage varying with said condition, means for impressing on said circuit a low frequency alternating voltage comprising two electric heating resistances, a thermopile having junctions of one polarity in position to absorb heat from one of said resistances and having its junctions of opposite polarity in position to absorb heat from the other of said resistances, and means for passing energizing currents alternately through said resistances.

8. In a control system, the combination with an electrical control circuit, of a device responsive to current flow through said circuit, means responsive to a controlling condition for impressing on said circuit a small uni-directional voltage varying with said condition, means for impressing on said circuit a low frequency alternating voltage comprising two electric heating resistances, a thermopile having junctions of one polarity in position to absorb heat from one of said resistances and having junctions of opposite polarity in position to absorb heat from the other of said resistances, means for passing energizing currents alternately through said resistances, and means for varying the relative values of said energizing currents.

9. In a control system, the combination with an electrical control circuit, of a device responsive to current flow through said circuit, means responsive to a controlling condition for impressing on said circuit a small uni-directional voltage varying with said condition, means for impressing on said circuit a low frequency alternating voltage comprising two electric heating resistances, a thermopile having junctions of one polarity in position to absorb heat from one of said resistances and having its junctions of opposite polarity in position to absorb heat from the other of said resistances, and means including a motor actuated switch for passing energizing currents alternately through said resistances.

10. In a control system, the combination with an electrical control circuit, of a device responsive to current flow through said circuit, means responsive to the value of a control quantity for impressing on said circuit a small unidirectional voltage varying with said value, solely electrical physically stationary means impressing on said circuit a low frequency fluctuating voltage, and means actuated by sa.d device to maintain a control action of one magnitude or of a different magnitude accordingly as the magnitude of said current is less than or exceeds a predetermined value.

11. In a control system, the combination with an electrical control circuit, of a device responsive to current flow through said circuit, means responsive to a controlling condition for impressing on said circuit a small unidirectional voltage varying with said condition, solely electrical physically stationary means for impressing on said circuit a low frequency fluctuating voltage of a magnitude less than the normal magnitude of the first mentioned voltage as the latter varies through a throttling range, means actuated by said device to maintain a control action of one magnitude or of a different magnitude, accordingly as the magnitude of said current is less than or exceeds a predetermined value, and means for adjusting said solely electrical means for varying the magnitude of said fluctuating voltage and thereby varying said throttling range.

12. In a control system, the combination with an electrical control circuit, of a device responsive to current flow through said circuit, means responsive to a controlling condition for impressing on said circuit a small unidirectional voltage varying with said condition, solely electrical physically stationary means for impressing on said circuit a low frequency fluctuating voltage of a magnitude less than the normal magnitude of the first mentioned voltage, means actuated by said device to maintain a maximum control action accordingly as the magnitude of said current is less than or exceeds a predetermined value, and means for adjusting said solely electrical means to vary the relative maximum values of the components of said fluctuating voltage in the direction of, and in the direction opposite to said unidirectional voltage.

13. In a heater control system, the combination with a control circuit including a deflecting potentiometer, a resistance and a thermocouple responsive to a heater control temperature, of means for impressing on said resistance a potential alternating regularly at low frequency and thereby co-acting with said thermocouple and potentiometer to create a pulsating unidirectional current flow in said circuit, said last mentioned means including a relaxation oscillator, and means actuated by said control circuit to supply heat to said heater at a maximum or at a minimum rate accordingly as said current flow is less than or exceeds a predetermined value.

14. In an electrical control system, the combination with a condition responsive device maintaining a small unidirectional voltage varying with said condition and means for producing a low frequency alternating voltage co-acting with the first mentioned voltage to maintain a pulsating control current, said last mentioned means comprising a relaxation oscillator.

15. In a control system, the combination with an electrical control circuit, of a device responsive to current flow through said circuit, means responsive to a controlling condition for impressing on said circuit a small unidirectional voltage varying with said condition, means for impressing on said circuit a low frequency fluctuating voltage comprising physically stationary means having two operative conditions and operative in one condition to impress on said circuit a gradually increasing voltage of one polarity and operative in the other of said conditions to impress on said circuit a gradually increasing voltage of the opposite polarity and means to alternately adjust said physically stationary means to each of its operative conditions, and means actuated by said device to maintain a control action of one magnitude or of a different magnitude accordingly as the magnitude of said current is less than or exceeds a predetermined value.

16. In a control system the combination with an electrical control circuit, of a device responsive to current flow through said circuit, means responsive to a control condition for impressing on said circuit a small unidirectional voltage varying with said condition, solely electrical physically stationary means for impressing on said circuit a low frequency fluctuating voltage of a magnitude less than the normal magnitude of the first mentioned voltage as the latter varies through a throttling range, means actuated by said device to maintain a control action of one magnitude or of a different magnitude, accordingly as the magnitude of said current is less than or exceeds a predetermined value, and means for varying the magnitude of said fluctuating voltage and thereby varying said throttling range.

17. In a control system, the combination with an electrical control circuit, of a device responsive to current flow through said circuit, means responsive to the value of a control quantity for impressing on said circuit a small unidirectional voltage varying with said value, solely electrical physically stationary means for impressing on said circuit a low frequency fluctuating voltage of a magnitude less than the normal magnitude of the first mentioned voltage, means actuated by said device to maintain a maximum or minimum control action accordingly as the magnitude of said current is less than or exceeds a predetermined value, and means for adjusting the second mentioned means to vary the relative maximum values of the components of said fluctuating voltage in the direction of, and in the direction opposite to said undirectional voltage.

HARRY S. JONES.